(12) United States Patent
Li

(10) Patent No.: US 10,006,796 B2
(45) Date of Patent: Jun. 26, 2018

(54) DEVICE, CONTAINER AND METHOD FOR MEASURING LIQUID VOLUME IN CONTAINER BASED ON AIR PRESSURE SENSING

(71) Applicant: Shenzhen Mecare Network Technology Co., Ltd., Shenzhen (CN)

(72) Inventor: Xiaoliang Li, Shenzhen (CN)

( * ) Notice: Subject to any disclaimer, the term of this patent is extended or adjusted under 35 U.S.C. 154(b) by 0 days. days.

(21) Appl. No.: 15/827,409

(22) Filed: Nov. 30, 2017

(65) Prior Publication Data

US 2018/0087947 A1    Mar. 29, 2018

Related U.S. Application Data

(63) Continuation of application No. PCT/CN2015/082348, filed on Jun. 25, 2015.

(30) Foreign Application Priority Data

Jun. 1, 2015 (CN) .......................... 2015 1 0293747

(51) Int. Cl.
  *G01F 17/00* (2006.01)
  *G01F 22/02* (2006.01)
(52) U.S. Cl.
  CPC .................. *G01F 22/02* (2013.01)
(58) Field of Classification Search
  None
  See application file for complete search history.

(56) References Cited

U.S. PATENT DOCUMENTS 6,782,339 B2 * 8/2004 Neeser .................. F17C 13/025
                                            702/156
7,174,780 B2 * 2/2007 Akahane ............... F02D 33/003
                                            73/149
7,658,103 B2 * 2/2010 Nakamura .............. G01F 22/02
                                            73/290 R (Continued)

FOREIGN PATENT DOCUMENTS

CN    202648730 U    1/2013
CN    103445617 A    12/2013

(Continued)

*Primary Examiner* — Peter Macchiarolo
*Assistant Examiner* — Jermaine Jenkins
(74) *Attorney, Agent, or Firm* — Wayne & Ken, LLC; Tony Hom

(57) ABSTRACT

The present disclosure discloses a device, a container and a method for measuring a liquid volume in a container based on air pressure sensing. The measuring device includes a moving member, a unidirectional member, an air pressure detection device and a controller. The moving member is connected with a con tamer to be detected to form a gas storage space. By using the unidirectional member, the gas storage space is communicated with the external environment when the volume decreases, and remains sealed with the external environment when the volume increases. The air pressure detection device is disposed on the moving member to measure a pressure value in the gas storage space. The device accurately measures the liquid volume in the container, effectively eliminates the interference of liquid motion on the measurement result, and can be conveniently used to detect a water volume in the natural usage.

19 Claims, 11 Drawing Sheets

(56) References Cited

U.S. PATENT DOCUMENTS

| | | | | |
|---|---|---|---|---|
| 8,561,459 B2* | 10/2013 | Caldwell | ............... | G01F 22/02 |
| | | | | 73/149 |
| 2007/0068241 A1* | 3/2007 | Bains | ................. | G01F 17/00 |
| | | | | 73/149 |
| 2011/0077876 A1* | 3/2011 | Ellingsen | ............. | B01L 3/0293 |
| | | | | 702/55 |

FOREIGN PATENT DOCUMENTS

| | | |
|---|---|---|
| CN | 104265265 A | 1/2015 |
| CN | 204730907 U | 10/2015 |
| DE | 4127233 A1 | 2/1993 |
| WO | 2013051823 A2 | 4/2013 |
| WO | 2013051823 A3 | 7/2013 |

* cited by examiner

DEVICE, CONTAINER AND METHOD FOR MEASURING LIQUID VOLUME IN CONTAINER BASED ON AIR PRESSURE SENSING

TECHNICAL FIELD

The invention relates to the field of intelligent equipment, and more specifically to a device for measuring a liquid volume. The invention further relates to a container capable of measuring the volume of an internal liquid and a method for measuring the volume of the liquid in the container.

BACKGROUND OF THE INVENTION

Water serves as a life source, is an essential substance for life of people, and is helpful for people to keep the health in a correct drinking mode. However, the past, people rely on their own feelings to drink water and cannot intuitively understand amount of their own Water drinking. With the improvement of the health awareness of people and the improvement of the technology, the intelligent water drinking device is popular with people, and the amount of water taken by people for one day can be accurately measured, so that people can reasonably plan amount of their own water drinking, and meanwhile, the drinking water data becomes an important part in the whole large health data. But the existing intelligent water drinking device is generally provided with a measuring device on a container, and the method has some defects: firstly, due to the requirements of water leakage prevention, heat preservation and other aspects, the self structure (including shapes, materials, functions and the like) has certain limitation, therefore, the adding of the measuring device can further increase the design and manufacturing difficulty of the container, and the product cost is increased; secondly, the measuring device does not have universality, and each container needs to be independently designed, so the production cost is further increased; thirdly, an existing measuring device is generally a liquid level sensor, and the stability is poor, the measurement error caused by the inclination of the container and the shape of the container can be easily caused, so the requirement for accurate measurement is difficult to meet.

Therefore, there is a great need for a measuring device with high universality and good measuring stability.

SUMMARY OF THE INVENTION

In order to overcome the defects in the prior art, the invention provides a device for measuring a liquid volume in a container based on air pressure sensing, which can accurately measure the volume of the liquid in the container, effectively eliminate the interference of the liquid motion on the measuring result, and has good measuring stability. The device is matched with containers with different materials, functions and capacities, and has advantages of high universality and easy to use. Besides, the water volume detection is completed in a natural usage without special operations.

The invention provides a container for measuring the volume of internal liquid.

The invention provides a method for measuring the volume of the liquid in the container based on air pressure sensing.

The present technical solution adopted by the invention to solve the technical problem is as follows:

A device for measuring a liquid volume in a container based on air pressure sensing, comprising:

a moving member and a unidirectional member; the moving member is connected with a container to be detected to form a gas storage space in the container, and changes a volume of the gas storage space via a movement relative to the container; the gas storage space communicates with an external environment when the volume decreases by the unidirectional member, and remains sealed off from the external environment when the volume increases, and an increased volume value is a definite value;

an air pressure detection device; the air pressure detection device is disposed on the moving member to measure a pressure value in the gas storage space; and a controller, the controller is configured to receive an air pressure value obtained by the air pressure detection device, and calculates a liquid volume in the container to be detected based on the air pressure value and the definite volume value stored and a volume value of the container to be detected.

As a further improvement mode of the above scheme, the device further comprises at least one limiting device for determining an increased volume value of the gas storage space.

As a further improvement mode of the above scheme, there are at least two limiting devices and are located on a same horizontal plane, and the limiting devices are made of conductive materials; the air pressure detection device performs a first detection of the air pressure value in the air storage space when being conducted between the limiting devices; a second detection of the air pressure value in the gas storage space is carried out when the limiting devices are disconnected again, and the second detection is carried out continuously until the gas storage space is communicated with the external environment.

As a further improvement mode of the above scheme, the limiting device comprises at least one fastener and an elastic member arranged under the fastener correspondingly; the fastener and the elastic member are made of conductive materials; the elastic member moves elastically to have a first state of conducting with the fastener and a second state of disconnecting from the fastener; the air pressure detection device performs the first detection of the air pressure value in the gas storage space when the elastic member is in the first state; and the second detection of the air pressure value in the gas storage space is carried out when the elastic member is in the second state again, and the second detection is carried out continuously at least until the gas storage space is communicated with the external environment.

As a further improvement mode of the above scheme, the moving member is a cover body, and an extending part with a fixed size is provided on the cover body; a sealing ring is arranged on a periphery of the extending part.

As a further improvement mode of the above scheme, a cavity is provided on the extending part, and the air pressure detection device is arranged in the cavity; an air hole is formed on the cavity, and the air pressure detection device measures the air pressure in the gas storage space by the air hole.

As a further improvement mode of the above scheme, the air pressure detection device realizes a waterproof function by covering the air hole with a waterproof breathable film and/or adopting, a waterproof air pressure detection device.

As a further improvement mode of the above scheme, a gas chamber for containing gas is arranged on the moving member, the gas chamber is communicated with the gas storage space.

As a further improvement mode of the above scheme, comprising a water level detection rod is arranged at the top end of the gas chamber.

A device for measuring a liquid volume in a container based on air pressure sensing, comprising:

a moving member and a unidirectional member; the moving member is connected with a container to be detected to form a gas storage space in the container, and changes a volume of the gas storage space via a movement relative to the container; the gas storage space communicates with an external environment when the volume decreases by the unidirectional member, and remains sealed off from the external environment when the volume increases, and an increased volume value is a definite value;

an air pressure detection device; the air pressure detection device is disposed on the moving member to measure a pressure value in the gas storage space;

a volume detection device, and the volume detection device is arranged on the moving member for detecting the increased volume value of the gas storage space; and a controller; the controller is configured to receive the air pressure value obtained by the air pressure detection device and the volume value obtained by the volume detection device, and calculates a liquid volume in the container to be detected based on the air pressure value, the volume value and the volume value of the container to be detected.

As a further improvement mode of the above scheme, the volume detection device comprises an angle sensor and a thread arranged on the moving member, a thread pitch of the thread is fixed and known; the angle sensor is used for detecting an angle value of rotating the moving member, and transmitting the angle value to the controller.

As a further improvement mode of the above scheme, the moving member is a cover body, and an extending part with a fixed size is provided on the cover body; a sealing ring is arranged on a periphery of the extending part.

As a further improvement mode of the above scheme, a cavity is provided on the extending part, and the air pressure detection device is arranged in the cavity; an air hole is formed on the cavity, and the air pressure detection device measures the air pressure in the gas storage space by the air hole.

As a further improvement mode of the above scheme, the air pressure detection device realizes a waterproof function by covering the air hole with a waterproof breathable film and/or adopting a waterproof air pressure detection device.

As a further improvement mode of the above scheme, a gas chamber for containing gas is arranged on the moving member, the gas chamber is communicated with the gas storage space.

As a further improvement mode of the above scheme, comprising a water level detection rod is arranged at the top end of the gas chamber.

A container for measuring the volume of an internal liquid, the container is provided with a container opening, characterized by comprising the device for measuring the liquid volume in the container based on air pressure sensing of claim 1, the device for measuring the liquid volume in the container based on air pressure sensing is hermetically connected with the container opening through the moving member, and the gas storage space is formed in the container.

As a further improvement mode of the above scheme, a protrusion for winding a circle is arranged on an inner all of the container.

As a further improvement mode of the above scheme, at least the container opening is made of a conductive material.

A method for measuring the volume of the liquid in the container based on air pressure sensing, comprising the following steps:

S10, forming a sealed gas storage space in a container;

S20, increasing a volume of be gas storage space to reduce an air pressure in the gas storage space;

S30, obtaining fluid detection parameters, comprising an air pressure value in the container before reducing air pressure, the pressure value in the gas storage space after reducing air pressure, an increased volume value of the gas storage space and a volume value of the container;

S40, acquiring the liquid volume the container by using the fluid detection parameters;

As a further improvement mode of the above scheme, the method for reducing air pressure in the step S20 further comprises:

arranging a moving member and a unidirectional member;

changing a volume of the gas storage space via a movement relative to the container by the moving member; and by using the unidirectional member, communicating the gas storage space with an external environment when the volume decreases and remaining sealed with the external environment when the volume increases.

As a further improvement mode of the above scheme, the method in the step S30 for obtaining the increased volume value of the gas storage space further comprises:

enabling the moving member to be perpendicular to the movement direction and a cross section area directly acting on the gas is fixed and known;

obtaining a distance value of the movement of the moving member; and obtaining the increased volume value of the gas storage space by combining the cross section area and the distance value.

As a further improvement mode of the above scheme, the method for obtaining the distance value of the movement of the moving member further comprises:

arranging a limiting device, so that the distance of movement of the moving member is fixed and known in each time.

As a further improvement mode of the above scheme, the method or obtaining the distance value of the movement of the moving member further comprises:

threaded connecting the moving member with the container; wherein a thread pitch of the thread is fixed and known;

detecting an angle value of rotating the moving member; and calculating the distance value through the angle value and the thread pitch.

As a further improvement mode of the above scheme, the method for detecting the angle value comprises:

arranging an angle sensor, recording the value when the air pressure in the gas storage space starts to reduce as a first angle value, and recording the value in the rotation process or at the end of rotation as a second angle value; and a difference value of the second angle value and the first angle value is the angle value of rotating the moving member at corresponding moment.

As a further improvement mode of the above scheme, the method for obtaining the air pressure value in the gas storage space before and after reducing the air pressure in the step S30 comprises:

detecting the air pressure value in the container before and after reducing the air pressure through an air pressure sensor.

As a further improvement mode of the above scheme, the method for acquiring the volume of the liquid in the container in the step S40 further comprises:

obtaining the volume value of the gas in the container before reducing the air pressure according to the formula:

$$V_1 = P_1 V_x / (P_0 - P_1)$$

wherein V1 is the volume value of the gas in the container before reducing the air pressure Vx is the increased volume value of the gas storage space, P0 is the air pressure value in the container before reducing the air pressure, and P1 is the air pressure value in the air storage space after reducing the air pressure; and obtaining the liquid volume the container according to the formula:

$$V_2 = V - V_1$$

wherein V2 is the liquid volume value in the container, and V is the volume value of the container.

The beneficial effects of the present invention are as follows:

The volume of the liquid in the container is accurately measured, the influence of liquid shake on the measurement result is effectively eliminated, and the measuring stability is good; the device is matched with different materials, functions and capacities container, and is high in universality; the use is convenient, the water quantity detection is completed in a natural use process without special operations.

BRIEF DESCRIPTION OF THE DRAWINGS

The present invention is further described below with reference to the accompanying drawings and embodiments.

DETAILED DESCRIPTION OF THE INVENTION

Figure 1:
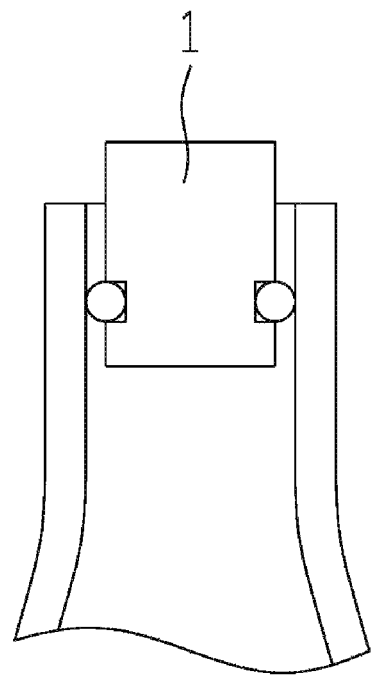
FIG. 1 is a schematic diagram of first embodiment of a moving member according to the present invention.

The conception, the specific structure and the technical effects of the present invention are clearly and completely described below with reference to the embodiments and the accompanying drawings so as to fully understand the objectives, solutions and effects of the present invention. It should be noted that, in the case of no conflict, the embodiments in the present application and the features in the embodiments may be combined with each other.

It should be noted that, unless otherwise specified, when a feature is referred to as "fixed" and "connected" in another feature, it can be directly fixed, connected to another feature, or indirectly fixed, connected to another feature. In addition, the description of upper, lower, left, right and the like used in the present invention is only relative to the mutual positional relationship of the respective components of the present invention in the drawings.

Also, unless defined otherwise, all techniques and scientific terms used herein have the same meaning as commonly understood by those ordinary skill in the art. The terminology used in the description herein is for the purpose of describing particular embodiments only and not for the purpose of limiting the same. As used herein, the term "and/or" includes any and all combinations of one or more of the associated listed items.

The measuring device disclosed in the present invention at least comprises a moving member, a unidirectional member, an air pressure detection device and a controller. The moving member forms a gas storage space with a container containing the liquid to be detected, and when the gas storage space is in a sealed state, the air pressure in the space is reduced by increasing the volume of the space, and the air pressure detection device is used for acquiring the gas pressure value, and the controller calculates a liquid volume in the container to be detected based on the air pressure value and the increased volume value of the gas storage space (namely the expansion value of the gas volume) and the volume value of the container to be detected. Specifically, the moving member is hermetically connected with the container opening, and the volume of the gas storage space is increased through the exit movement relative to the container, so that the air pressure in the space is reduced; the air pressure detection device is used for detecting the air pressure value in the container and the gas storage space before and after reducing the pressure.

Figure 2:
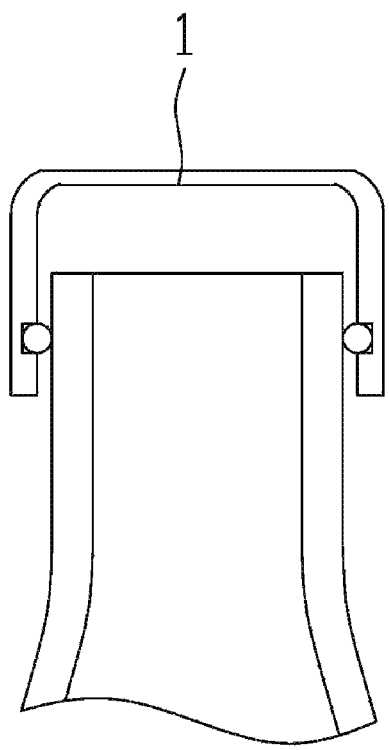
FIG. 2 is a schematic diagram of second embodiment of a moving member according to the present invention.
Figure 3:
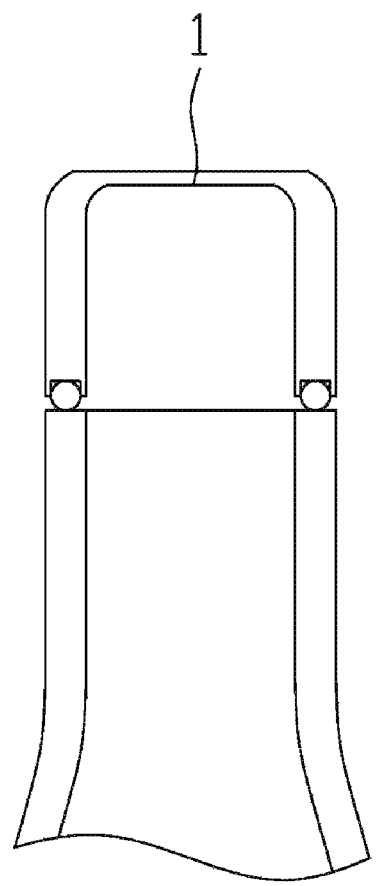
FIG. 3 is a schematic diagram of third embodiment of a moving member according to the present invention.

The moving member can be circular, square or other shapes, which is determined by the shape of the container opening, the moving member is sealed in a built-in manner. As shown in FIG. 1, the moving member 1 is columnar, and a sealing ring is arranged on the outer wall of the moving member 1, the moving member is stuffed into the container opening, and the sealing process is completed through the sealing ring and the inner wall of the container. The moving member can also be external, as shown in FIG. 2, the moving member 1 is arranged as a cover body, and a sealing ring is arranged on the inner wall of the cover body, the cover body is buckled with the container opening, and the sealing process is completed through the sealing ring and the outer wall of the container. In addition, the moving member 1 can also be in parallel sealed with the container, as shown in FIG. 3, the size of the sealing part of the moving member 1 is equal to the size of the container opening, and sealing is carried out through the sealing rings therebetween. It can be understood that the three modes are combined with each other. The moving member can be directly connected with the container in a sealed mode, and the process is completed through other accessory structures.

Figure 4:
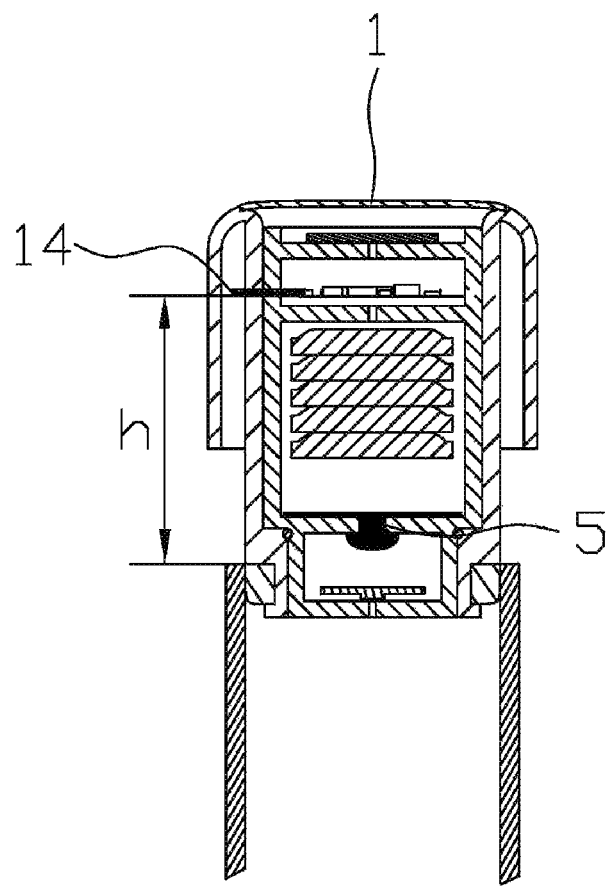
FIG. 4 is a crass-sectional view of first embodiment of a static detection scheme according to the present invention.

The present invention discloses a static detection scheme of a measuring device. In the scheme, the increased volume value of the gas storage space is static, that is, the volume value is a definite value, and the definite value is stored in a controller, and the definite value can be known through pre-limitation/measurement, and particularly, the increased volume of the gas storage space (expansion volume) is equal to the volume of the moving member exiting the gas storage space, so that the detection of the expansion volume is essentially the detection of the exiting volume of the moving member; and under the condition that the cross sectional area of the moving member is certain, the exiting volume is known only by obtaining the moving distance of the moving member, and the specific implementation mode is as follows:

the device comprises a limiting device, wherein the limiting devices enable the moving member to enter a fixed distance in the container and then is abutted by the container so as to limit the movement of the moving member, and the distance value can be known through pre-limitation/measurement, and the distance of the moving member exiting from the container is obviously equal to the invasion distance, and in combination with the area of the cross-section of the moving member (the cross section refers to the direction perpendicular to the movement of the moving member and acts directly on the cross section of the gas, and the area of the gas can be known/measured in advance), the exit volume, namely, the expansion of the gas, can be obtained by a simple calculation. Preferably, referring to FIG. 4, the position where the moving member and the sealing structure just begin to form a sealing relation is taken as a starting point, the limiting devices 14 enables the moving member to be abutted by the container opening after being pressed by a certain distance h relative to the container, and obviously, the distance of the moving member exiting from the container is equal to the distance value h of the downward pressing, the h value can be limited to a definite value through the structure.

In order to achieve the purpose of reducing pressure, the moving member firstly invades a part of the gas storage space, and in this process, the air pressure value in the space should be equal to the ambient air pressure value of the external environment. Therefore, a unidirectional member 5 is further arranged; through the unidirectional member 5, the gas storage space is communicated with the external environment when the volume of the gas storage space is reduced, and the gas storage space is kept sealed with the external environment when the volume of the gas storage space is increased; so that in the process of the moving member extends into the container, the air pressure in the air storage space is always equal to the ambient air pressure of the external environment; and when the moving piece moves reversely, the unidirectional member 5 is closed to enable the gas storage space to be in a sealed state, and the air pressure in the air storage space is continuously reduced along with the exit of the moving member; and the minimum value is reached at the moment before the moving member and the container are unsealed.

Figure 5:
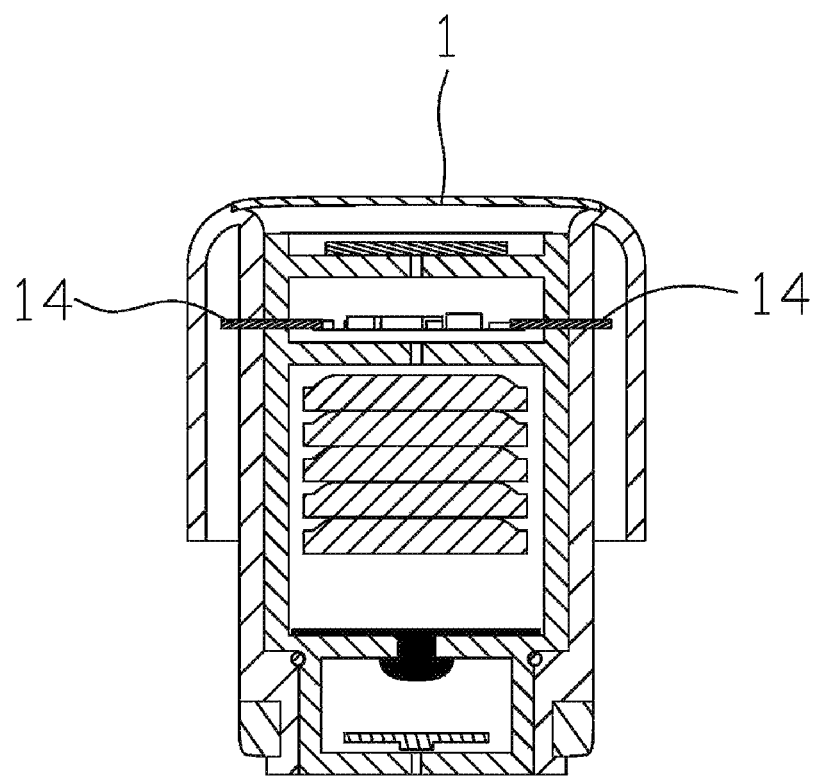
FIG. 5 is a cross-sectional view of second embodiment of a static detection scheme according to the present invention.

In an ideal situation, the measurement of the air pressure in the gas storage space needs to be synchronously started after the moving member starts to exit the container. However, the above-mentioned limiting device only play the role of limiting the displacement and obtaining the moving distance, the function of synchronous detection cannot be realized, and in order to solve the problem, the invention discloses an improved mode of a limiting device:

Referring to FIG. 5, there are at least two limiting devices 14 and are located in the same horizontal plane; the limiting devices 14 are made of a conductive material, the air pressure detection device performs a first detection of the air pressure value in the air storage space when being conducted between the limiting devices; and a second detection of the air pressure value in the gas storage space is carried out when the two limiting devices are disconnected again; the second detection is carried out at least continuously until the gas storage space is communicated with the external environment environment. The method is suitable for a container with a conductive function, when the container opening is in contact with the two limiting devices at the same time, the limiting devices are conducted through the container, so that the air pressure detection device is triggered for the first detection, and at the moment, the air pressure in the gas storage space is equal to the ambient air pressure, so that the first detection can obtain the external environment air pressure value (namely, the air pressure value of the initial state); when the container opening is separated from the limiting devices and the two position limiting devices are disconnected again, the air pressure detection device is triggered to can out the second detection, and at the moment, it means that the moving member starts to exit from the container, that is, the pressure reduction begins; as the volume of the gas storage space is continuously increased, the air pressure value in the air storage space keeps reduced, and the minimum value is reached at the moment before the gas storage space is unsealed. Therefore, the second detection is carried out at least continuously until the gas storage space is communicated with the external environment and is used for detecting the minimum value.

Figure 6:
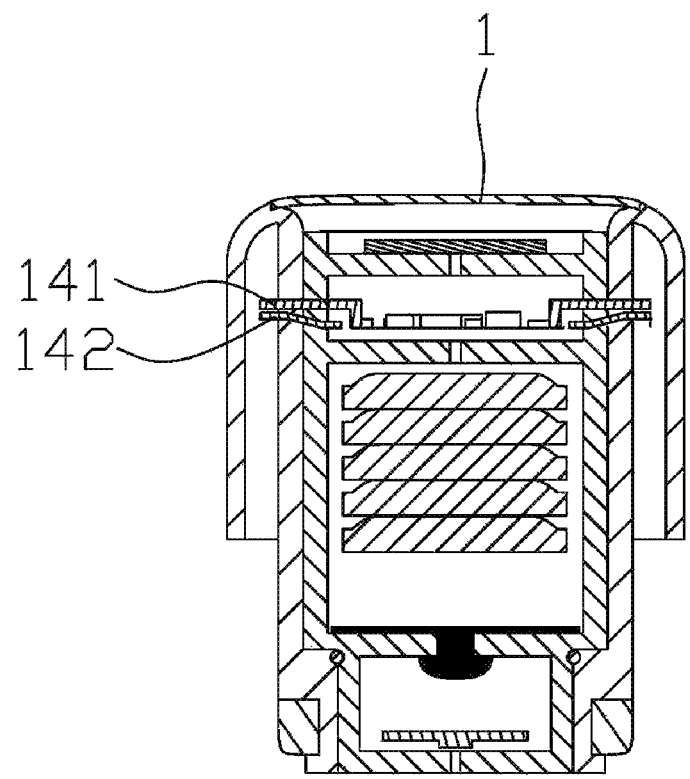
FIG. 6 is a cross-sectional view of third embodiment of a static detection scheme according to the present invention.

The above embodiments are only suitable for a container with a conductive function, but cannot be achieved for container made of insulating materials. In addition, due to the existence of the error, the container may not be simultaneously in contact with the limit device, so that synchronous measurement cannot be realized. Therefore, the invention discloses a further improvement mode, and referring to FIG. 6, the limiting devices comprise a fastener 141 and an elastic member 142 correspondingly arranged under the fastener 141, the fastener 141 and the elastic member 142 are made of a conductive material, and the elastic member 142 can move elastically, so as to have a first state of conducting with the fastener 141 and a second state of disconnecting from the fastener 141; when the moving member moves downwards to a certain distance, the container opening abuts against the elastic member 142 to enable the elastic member 142 to be in contact with the fastener 141, the method is not limited to be material of the container, so that the problems of the above embodiment is effectively solved.

Similarly, the air pressure detection device performs a first detection of the air pressure value in the gas storage space when the elastic member is in the first state; and the second detection of the air pressure value in the gas storage space is carried out when the elastic member is in the second state again, and the second detection is carried out continuously at least until the gas storage space is communicated with the external environment environment, so as to obtain an external environment air pressure value and a minimum value after pressure reduction.

Figure 7:
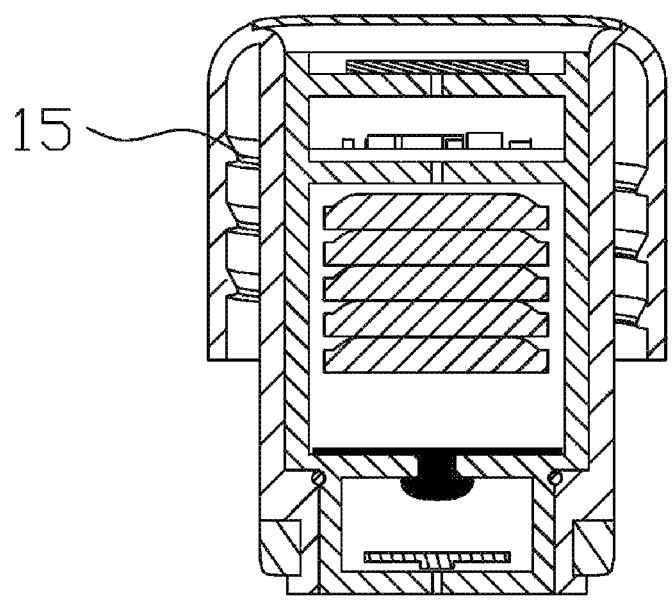
FIG. 7 is a cross-sectional view of firs embodiment of a dynamic detection scheme of the present invention.

The present invention further discloses another scheme of the measuring device. Similarly, the measuring device also comprises a moving member, a unidirectional member, an air pressure detection device and a controller. Compared with the static detection scheme described above, the difference is that the increased volume value of the gas storage space is not pre-input, but is detected in real time through a volume detection device, referring to FIG. 7, the volume detection device comprises a thread 15 arranged on the moving member 1, and the thread pitches of the thread are fixed and known, and the moving member 1 is connected to the container through the thread in a threaded manner, and can be screwed into and screwed out. The volume detection device also comprises an angle sensor (not shown) capable of detecting the rotating angle of the moving member 1, the sensor can transmit the obtained angle value to the controller. By combining the angle value and the thread pitch, the dynamic detection of the moving distance can be realized, and therefore the value of an increase in volume of the gas storage space is further determined.

It can be understood that the static detection scheme and the dynamic detection scheme are not absolutely independent, the two can be combined with practical so as to achieve the optimal measurement effect.

The measuring device disclosed by the present invention can also be provided with an output terminal, and the output terminal can output the liquid volume data in the form of voice, characters or images.

Figure 8:
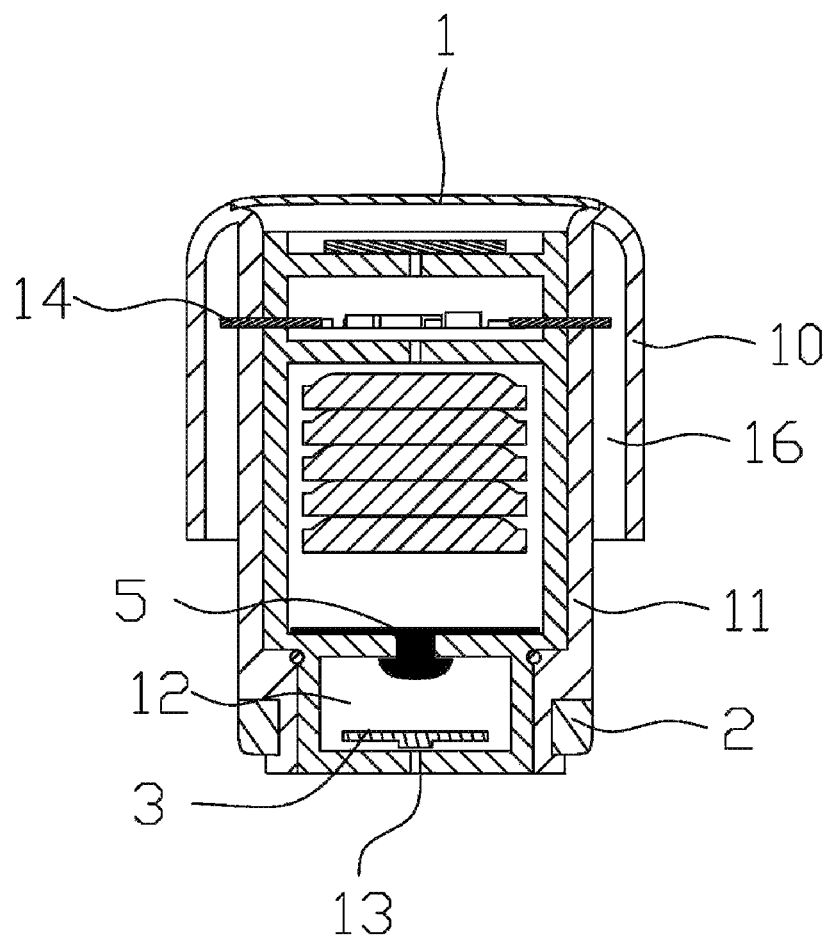
FIG. 8 is a cross-sectional view of first embodiment of a measuring device according to the present invention.

Referring to FIG. 8, a cross-sectional schematic diagram of first specific embodiment of the measuring device is shown, the moving member 1 comprises a circular cover body 10, comprising a bottom wall and a rim arranged along a circumferential direction of the bottom wall, an extending part 11 is arranged on the inner side of the bottom wall, and the extending part 11 is preferably cylindrical, and a gap 16 is formed between the extending part and the rim used for containing the container. A sealing structure is arranged on the periphery of the extending part 11 of the container opening, in the embodiment, the sealing structure is preferably a sealing ring 2; and when the container opening is inserted into the gap, the inner wall of the container is matched with the sealing ring 2, and the air storage space is formed in the container.

Further, the air pressure detection device is arranged in the extension part 11, specifically, a cavity 12 is formed in the extending part 11, the air pressure detection device is fixed therein, the cavity 12 of the air pressure detection device is communicated with the external environment environment when the moving member is separated from the container. An air hole 13 is formed in the cavity 12, the air pressure detection device can measure the air pressure in the gas storage space through the air hole, and preferably, the cavity 12 is arranged at one end of the extending part 11 far away from the cover body 10, the air hole 13 is formed in the bottom wall of the cavity 12.

Because the cavity 12 is directly communicated with the gas storage space, in order to prevent liquid or steam from entering the cavity 12 and damaging the air pressure detection device 3, waterproof measures are further provided, and a preferable mode is that a waterproof breathable film (not shown) is covered on the air holes 13; the other preferred mode is an air pressure detection device 3 with a waterproof function, in the specific implementation process, either one of them can be independently adopted or the combination of both.

The unidirectional member 5 comprises a sealing surface and a limiting surface, they are connected into a whole through a connecting part; an opening is formed in the top wall of the cavity 12, the connecting part is arranged in the opening, so that the sealing surface and the limiting surface are located on the two sides of the top wall of the cavity 12 respectively; in an initial state, the sealing surface is attached to the top wall under the action of gravity, and the opening is closed; during the process that the moving member extends into the container, the unidirectional member is jacked up, so that the gas storage space is communicated with the external environment; when the moving member exits from the container, the sealing surface is adsorbed on the top wall again, and the gas storage space is sealed.

It is understood that the unidirectional member is not limited to the above embodiment, and can be any structure or device capable of realizing unidirectional function.

Figure 9:
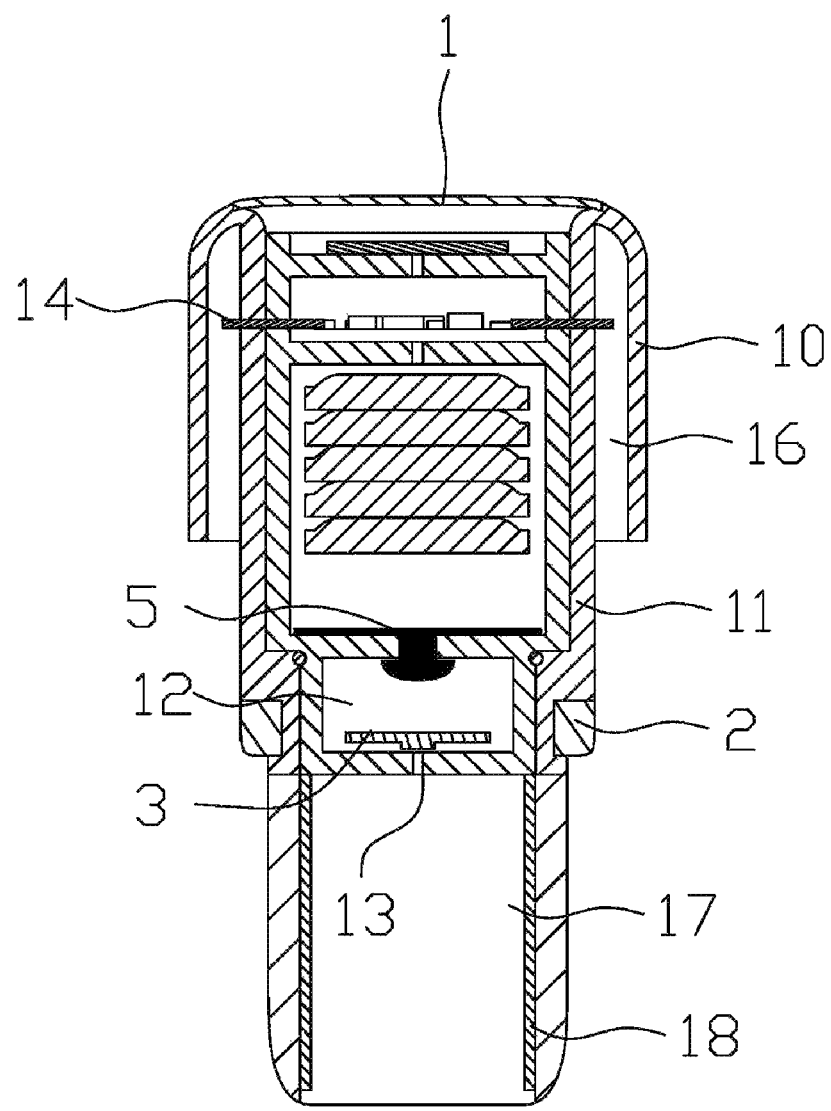
FIG. 9 is a cross-sectional view of second embodiment of a measuring device according to the present invention.

Referring to FIG. 9, a cross-sectional view of second embodiment of the measuring device is shown, and the difference from the first embodiment is that the moving member is provided with a gas chamber 17 for containing gas, a certain volume of gas can be contained in the chamber; the gas chamber 17 is communicated with the gas storage space after the gas storage space is formed, so that no matter how much liquid is stored in the container, a certain volume of buffer gas exists between the measuring device and the container all the time, and the air pressure cannot be changed in a large amplitude, therefore the air pressure sensor with the low detection limit can be selected.

As a preferred embodiment of the gas chamber, the gas chamber comprises a tubular structure extending from the end surface of the moving member, wherein an opening for communicating the gas storage space is formed in the tubular structure; the opening is preferably arranged at the top end of the tubular structure.

Further, a water level detection rod 18 is arranged at the top end of the gas chamber 17 and gives an alarm when the gas chamber 17 is in contact with the liquid level, and preventing liquid overflow caused by continuous invasion of the moving member under the condition that the liquid level in the container is too high. In order to avoid false alarm caused by liquid level fluctuation, the water level detection rod 18 is in two positions, an alarm is triggered only when the water level detection rods 18 at the two positions are in contact with the liquid level.

Figure 10:
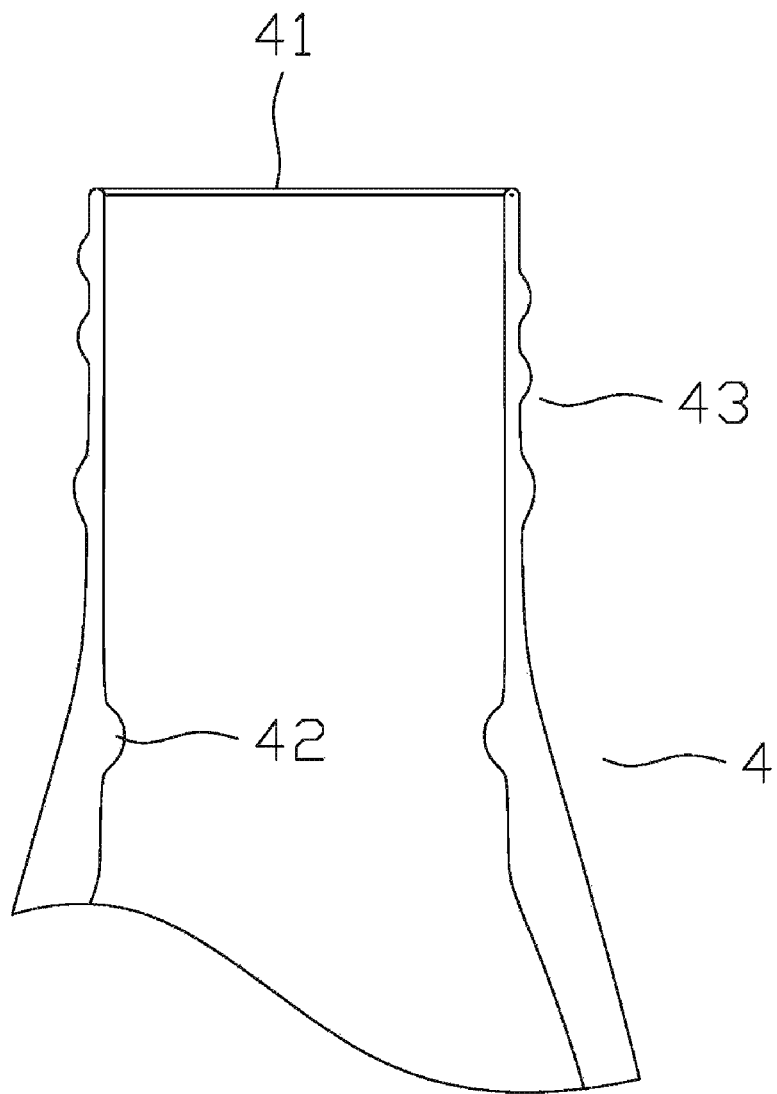
FIG. 10 is a cross-sectional view of an embodiment of a container according to the present invention.

The present invention further discloses a container for measuring the volume of internal liquid. Referring to FIG. 10, the container 4 is provided with a container opening 41, the moving member 1 is buckled on the container 4, the container opening 41 is inserted into the gap 16 between the cover body 10 and the extension part 11, and is in sealed connection with the extending part 11, and an air storage space is formed in the container, so that the movement of the extending part 11 relative to the container is realized by pulling or rotating the cover body.

Preferably, the inner wall of the container 4 is provided with a protrusion 42, and the extending part 11 extends into the container, the sealing ring 2 is extruded by the protrusion 42 to deform so as to achieve a better sealing effect and position more accurately the starting point of pressure reduction, that is, when the limiting member abuts against the container opening serves as a starting point of the stroke, when the sealing ring 2 and the protrusion 42 are unsealed serves as an end point of the stroke, and the distance between the two point is the distance of the moving member to reduce the pressure.

Preferably, the container 4 has a conductive function, and a conductive part can be arranged at the container opening 41, or may be made of a conductive material as a whole.

Preferably, the outer wall of the container 4 is provided with external thread 43 matched with the thread 15.

Figure 11:
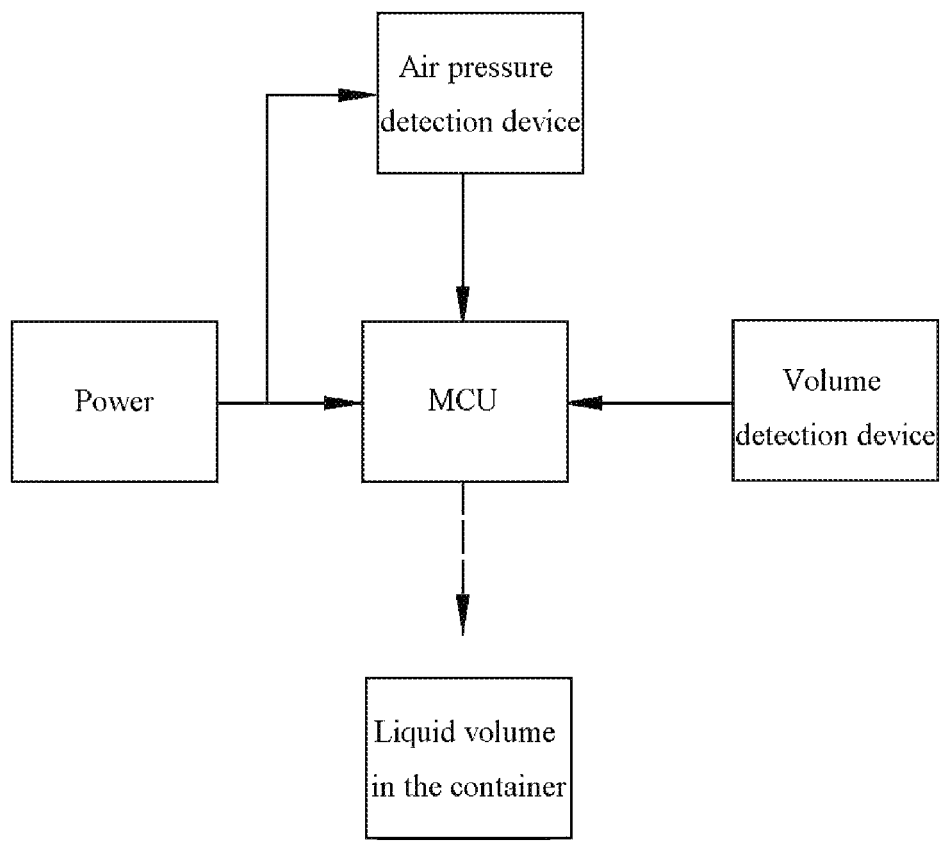
FIG. 11 is a schematic diagram of the present invention.

The present invention further discloses a method for measuring the volume of the liquid in the container based on air pressure sensing, referring to FIG. 11, comprising the following steps:

S10, forming a sealed gas storage space in the container.

S20, increasing the volume of the gas storage space, so as to reduce the air pressure in the gas storage space; preferably, the air pressure reduction method is provided with a moving member and a unidirectional member, the moving member changes a volume of the gas storage space via a movement relative to the container; by using the unidirectional member, the gas storage space is communicated with the external environment when the volume thereof decreases, and remains sealed off from the external environment when the volume thereof increases.

S30, obtaining a fluid detection parameters, the parameters comprise an pressure value in the container before reducing the air pressure, an pressure value in the gas storage space after reducing the air pressure reduction, the increased volume value of the gas storage space and the volume value of the container.

S40, acquiring the volume of the liquid in the container by using the fluid detection parameters.

wherein, the method for obtaining the increased volume value of the gas storage space is as follows: enabling the cross section area (the area can be pre-determined or obtained by measurement) of the moving member perpendicular to the movement direction and directly acting on the gas fixed and known, obtaining the distance value of the movement of the moving member; and the increased volume value of the gas storage space is obtained by combining the cross section area and the distance value.

The invention discloses a method for obtaining the movement distance of the moving member:

1. arranging a limiting device, so that the movement distance each time of the moving member is fixed and known. The increased volume value of the gas storage space is also constant when the cross section and movement distance of the moving member are constant.

2. connecting the moving member with the container through thread, and the thread pitch of the thread is fixed and known, detecting the angle value of the rotation of the moving member, and the distance value is calculated through the angle value and the thread pitch. Specifically, an angle sensor is arranged, the value is recorded as a first angle value when the air pressure in the gas storage space starts to be reduced, and the value is recorded as a second angle value in the rotation process or at the end of rotation; the difference value of the second angle value and the first angle value is the angle value of the rotation of the moving member at the corresponding moment.

For the first method, it is usually used in combination with a limiting device, and after the moving member moves to the limit position, the limiting devices are triggered and the pressure detection device starts to detect the air pressure in the container, this is the static detection method.

For the second method, the air pressure detection device detects the change of air pressure in real time (or at a certain fast frequency) when the moving member is separated from the container, when the air pressure in the gas storage space is reduced, recording the first air pressure value corresponding to the first angle value, similarly, recording the second air pressure value in the rotation process or at the end of rotation; in addition, a plurality of values can be recorded; by combining any set of angle values and air pressure values, a corresponding liquid quantity value can be obtained, and the measuring result is more accurate by combining a plurality of the liquid quantity values.

In addition, in step S30, the method for obtaining the air pressure value in the container before, and after reducing the air pressure is detected through the air pressure sensor.

S40 obtains the volume of the liquid in the container through the fluid detection parameters, and preferably, the method specifically comprises the following steps:

1. obtaining the volume value of the gas in the container before reducing the air pressure according to the formula:

$$V_1 = P_1 V_x / (P_0 - P_1)$$

wherein $V_1$ is the volume value of the gas in the container before reducing the air pressure, and $Vx$ is the increased volume value of the gas storage space, $P_0$ is the air pressure value in the container after the air pressure reduction, and $P_1$ is the air pressure value in the air storage space after reducing the air pressure, correspondingly in the static detection scheme, namely the minimum value, and correspondingly in the dynamic detection. scheme, namely the air pressure value after the moving member stops rotating.

2. obtaining the volume of the liquid in the container according to the formula:

$$V_2 = V - V_1$$

wherein $V_2$ is the volume value of the liquid in the container, and V is the volume value of the container.

The above is a specific description of the preferred embodiment of the present invention, However, the present invention is not limited to the embodiments, and various equivalent deformation or substitutions may be made by those skilled in the art without departing from the spirit of the present invention, these equivalent variations or replacements are included in the scope of the claims of the present application.

What is claimed is:

1. A device for measuring a liquid volume in a container based on air pressure sensing, comprising:
   a moving member and a unidirectional member; the moving member is connected with a container to be detected to form a gas storage space in the container, and changes a volume of the gas storage space via a movement relative to the container; the gas storage space communicates with an external environment when the volume decreases by the unidirectional member, and remains sealed off from the external environment when the volume increases, and an increased volume value is a definite value;
   an air pressure detection device; the air pressure detection device is disposed on the moving member to measure a pressure value in the gas storage space; and
   a controller; the controller is configured to receive an air pressure value obtained by the air pressure detection device, and calculates a liquid volume in the container to be detected based on the air pressure value and the definite volume value stored and a volume value of the container to be detected.

2. The device for measuring the liquid volume in the container based on air pressure sensing according to claim 1, characterized in that the device further comprises at least one limiting device for determining an increased volume value of the gas storage space.

3. The device for measuring the liquid volume in the container based on air pressure sensing according to claim 2, characterized in that there are at least two limiting devices and are located on a same horizontal plane, and the limiting devices are made of conductive materials; the air pressure detection device performs a first detection of the air pressure value in the air storage space when being conducted between the limiting devices; a second detection of the air pressure value in the gas storage space is carried out when the limiting devices are disconnected again, and the second detection is carried out continuously until the gas storage space is communicated with the external environment.

4. The device for measuring the liquid volume in the container based on air pressure sensing according to claim 2, characterized in that the limiting device comprises at least one fastener and an elastic member arranged under the fastener correspondingly; the fastener and the elastic member are made of conductive materials; the elastic member moves elastically to have a first state of conducting with the fastener and a second state of disconnecting from the fastener; the air pressure detection device performs the first detection of the air pressure value in the gas storage space when the elastic member is in the first state; and the second detection of the air pressure value in the arts storage space is carried out when the elastic member is in the second state again, and the second detection is carried out continuously at least until the gas storage space is communicated with the external environment.

5. The device for measuring the liquid volume in the container based on air pressure sensing according to claim 1, characterized in that the moving member is a cover body, and an extending part with a fixed size is provided on the cover body; a sealing ring is arranged on a periphery of the extending part.

6. The device for measuring the liquid volume in the container based on air pressure sensing according to claim 5, characterized in that a cavity is provided on the extending part, and the air pressure detection device is arranged in the cavity; an air hole is formed on the cavity, and the air pressure detection device measures the air pressure in the gas storage space by the air hole.

7. The device for measuring the liquid volume in the container based on air pressure sensing according to claim 6, characterized in that the air pressure detection device realizes a waterproof function by covering the air hole with a waterproof breathable film and/or adopting a waterproof air pressure detection device.

8. The device for measuring the liquid volume in the container based on air pressure sensing according to claim 1, characterized in that a gas chamber for containing gas is arranged on the moving member, the gas chamber is communicated with the gas storage space, and a water level detection rod is arranged at a top end of the gas chamber.

9. The device for measuring the liquid volume in the container based on air pressure sensing according to claim 1, characterized in that the method further comprises:
a volume detection device, and the volume detection device is arranged on the moving member for detecting the increased volume value of the gas storage space;
the controller is configured to receive the air pressure value obtained by the air pressure detection device and the volume value obtained by the volume detection device, and calculates a liquid volume in the container to be detected based on the at pressure value, the volume value and the volume value of the container to be detected.

10. The device for measuring the liquid volume in the container based on air pressure sensing according to claim 9, characterized in that the volume detection device comprises an angle sensor and a thread arranged on the moving member, a thread pitch of the thread is fixed and known; the angle sensor is used for detecting an angle value of rotating the moving member, and transmitting the angle value to the controller.

11. A container for measuring an internal liquid volume, wherein the container is provided with a container opening and comprises the device for measuring the liquid volume in the container based on air pressure sensing of claim 1, the device for measuring the liquid volume in the container based on air pressure sensing is hermetically connected with the container opening through the moving member, and the gas storage space is formed in the container.

12. The container for measuring the internal liquid volume according to claim 11, characterized in that a protrusion for winding a circle is arranged on an inner wall of the container, and the container opening is made of a conductive material.

13. A method for measuring a liquid volume in a container based on air pressure sensing, comprising the following steps:
S10, forming a sealed gas storage space in a container;
S20, increasing a volume of the gas storage space to reduce an air pressure in the gas storage space;
S30, obtaining fluid detection parameters, comprising an air pressure value in the container before reducing air pressure, the pressure value in the gas storage space after reducing air pressure, an increased volume value of the gas storage space and a volume value of the container;
S40, acquiring the liquid volume in the container by using the fluid detection parameters;
wherein the method for reducing air pressure in the step S20 further comprises:
arranging a moving member and a unidirectional member;
changing a volume of the gas storage space vis a movement relative to the container by the moving member; and
by using the unidirectional member, communicating the gas storage space with an external environment when the volume decreases arid remaining sealed with the external environment when the volume increases.

14. The method for measuring the liquid volume in the container based on air pressure sensing according to claim 13, characterized in that the method in the step S30 for obtaining the increased volume value of the gas storage space further comprises:
enabling the moving member to be perpendicular to the movement direction and a cross section area directly acting on the gas is fixed and known;
obtaining a distance value of the movement of the moving member; and
obtaining the increased volume value of the gas storage space by combining the cross section area and the distance value.

15. The method for measuring the liquid volume in the container based on air pressure sensing according to claim 14, characterized in that the method for obtaining the distance value of the movement of the moving member further comprises:
arranging a limiting device, so that the distance of movement of the moving member is fixed and known in each time.

16. The method for measuring the liquid volume in the container based on air pressure sensing according to claim 14, characterized in that the method for obtaining the distance value of the movement of the moving member further comprises:
threaded connecting the moving member with the container; wherein a thread pitch of the thread is fixed and known;
detecting an angle value of rotating the moving member; and
calculating the distance value through the angle value and the thread pitch.

17. The method for measuring the liquid volume in the container based on air pressure sensing according to claim 16, characterized in that the method for detecting the angle value comprises:
arranging an angle sensor,
recording the value when the air pressure in the gas storage space starts to reduce as a first angle value, and recording the value in the rotation process or at the end of rotation as a second angle value; and a difference value of the second angle value and the first angle value is the angle value of rotating the moving member at corresponding moment.

18. The method for measuring the liquid volume in the container based on air pressure sensing according to claim 13, characterized in that the method for Obtaining the air pressure value in the gas storage space before and after reducing the air pressure in the step S30 comprises:

detecting the air pressure value in the container before and after reducing the air pressure through an air pressure sensor.

19. The method for measuring the liquid volume in the container based on air pressure sensing according to claim 13, characterized in that the method for acquiring the volume of the liquid in the container in the step S40 further comprises:

obtaining the volume value of the gas in the container before reducing the air pressure according to the formula:

$$V_1 = P_1 V_x / (P_0 - P_1)$$

wherein $V_1$ is the volume value of the gas in the container before reducing the air pressure, $V_x$ is the increased volume value of the gas storage space, $P_0$ is the air pressure value in the container before reducing the air pressure, and $P_1$ is the air pressure value in the air storage space after reducing the air pressure; and obtaining the liquid volume in the container according to the formula:

$$V_2 = V - V_1$$

wherein $V_2$ is the liquid volume value in the container, and $V$ is the volume value of the container.

* * * * *